United States Patent Office 3,132,255
Patented May 5, 1964

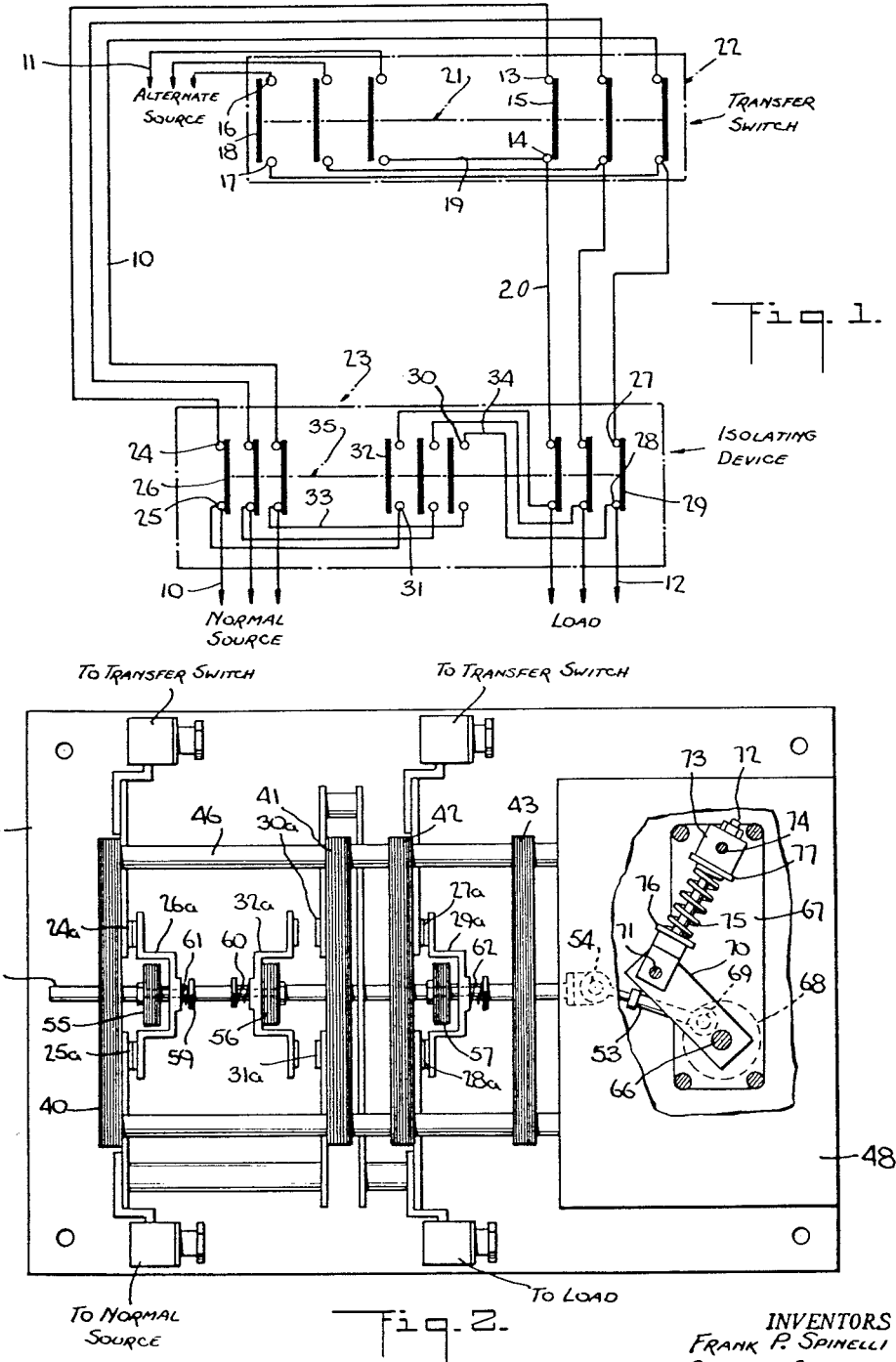

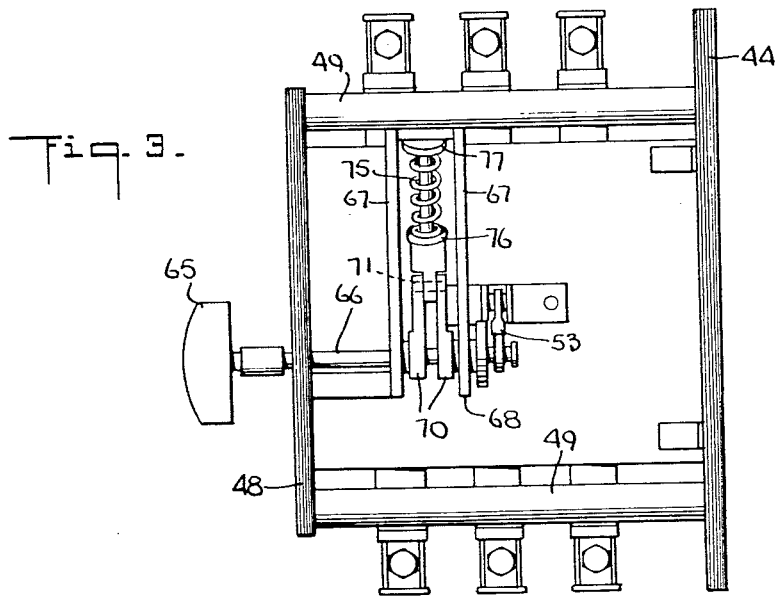
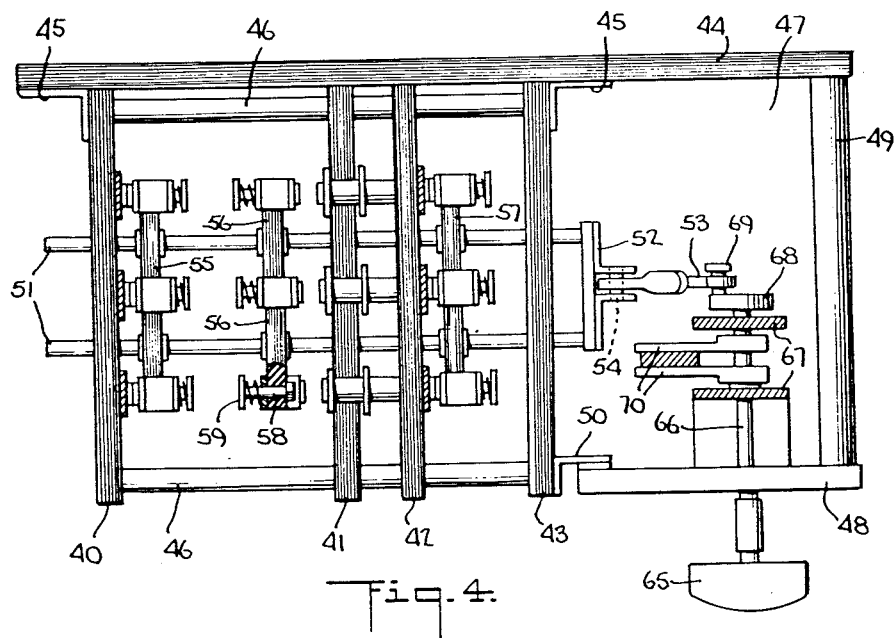

3,132,255
ISOLATING DEVICE FOR TRANSFER SWITCH INSTALLATIONS
Frank P. Spinelli, Teaneck, and Charles Stotz, Upper Montclair, N.J., assignors to Automatic Switch Co., Florham Park, N.J., a corporation of New York
Filed May 1, 1959, Ser. No. 810,326
5 Claims. (Cl. 307—64)

This invention relates generally to electric power plant installations, and has particular reference to transfer switches controlling the connection of a load circuit to normal or alternate sources of power.

More particularly, the invention relates to an improved transfer switch installation in which a complete isolation of the transfer switch can be achieved, when desired, without interruption of current flow to the load circuit.

Certain features of the invention, especially those relating the mechanical design and mode of operation of certain switch elements, have a wider applicability and are not necessarily limited to the field of transfer switches or to isolating devices for such switch installations.

It is common practice in many industrial establishments, as well as elsewhere, to provide a stand-by alternate power source which can be called into use, either automatically or otherwise, in the event of failure of a normal source of electric power. The transfer of the load circuit from one to the other of these power supplies is brought about by a transfer switch unit in which a normally closed switch is interposed between the load circuit and the normal source, while a normally open switch lies between the load and the alternate source. These switches are actuated in unison so that one is always closed while the other is open. During the initial installation of the transfer switch unit, and at subsequent times as well, it often becomes necessary to adjust or repair the unit. It is equally desirable, and in many types of operations highly important, that the feeding of electric power to a load circuit remain completely uninterrupted. In accordance with this invention, both of these results can be achieved by means of an isolating device that is thoroughly practical, reliable, easy to manufacture and install, and simple both from an electrical and a mechanical standpoint.

The invention makes it possible to provide a relatively simple device which can be installed as an accessory to a transfer switch unit, or furnished at the outset as a built-in permanent part of the transfer switch installation. Briefly stated, the isolating device involves three switch assemblies, the first being a normally closed switch interposed in the normal-source circuit, the second being a normally closed switch in the load circuit, and the third being a normally open by-pass switch between the normal-source circuit and the load circuit. These switches are actuatable in unison so that electrical power can continue to be fed through the by-pass to the load during a complete isolation of the transfer switch unit from both the normal power source and the load.

The mechanical arrangement whereby this desirable result can be accomplished simply and reliably involves a stack of spaced parallel insulating plates, a pair of fixed switch contacts on each plate, a movable switch element for each pair, and a common actuating element for all the movable switch elements. The applicability of this phase of the invention to other fields and purposes stems from the special manner in which the spaced insulating plates are assembled in association with the various switch elements both fixed and movable, whereby any of a variety of switching arrangements can be expeditiously assembled and operated, utilizing in each case the same basic parts and operating mechanisms.

Since the invention is primarily applicable to, and particularly useful for, transfer switch installations, the nature of the invention will be illustrated and described in an embodiment of that kind. One way, therefore, of achieving the objects and advantages of the invention, and such other advantages and purposes as may hereinafter be pointed out, is illustratively exemplified in the device and installation shown in the accompanying drawings, in which—

FIGURE 1 is a circuit diagram of a transfer switch unit and an isolating device in an installation embodying the features of this invention;

FIGURE 2 is a front elevational view of an illustrative mounting and mode of operation of an isolating device having the electrical capabilities indicated in FIGURE 1;

FIGURE 3 is an end view; and

FIGURE 4 is a plan view, of the device shown in FIGURE 2.

The electrical installation shown in FIGURE 1 is a three-phase system, but this is of no special significance, since the features of the invention are applicable to electric circuits generally, whether multi-phase or not. The circuit designated 10 leads to a normal source of electric power. The circuit 11 leads to a source of alternate power. The circuit shown at 12 is the load circuit, leading to the machinery or other apparatus which consumes the electric power fed to it.

Interposed between the circuit 10 and the load circuit 12 is a normally closed switch consisting of at least one pair of fixed switch contacts 13, 14, and a movable switch element 15 adapted to move toward and away from the contacts 13, 14 to establish and break an electrical connection between them. In a three-phase system, this switch (as well as the other switches hereinafter to be referred to) consists of triplicated parts, but for the sake of simplicity only one set of parts will be referred to in each case.

Interposed between the load circuit 12 and the alternate power circuit 11 is a normally open switch consisting of at least one pair of fixed contacts 16, 17, and a switch element 18 movable to establish or to break a connection between the fixed contacts. To complete the desired connections to the load circuit 12, the fixed contacts 14 and 17 may be permanently connected as indicated at 19, and the contact 14 may be connected to the load circuit 12 as indicated at 20.

The normally closed and normally open switches are so mounted and arranged that they may be actuated in unison so that one is always closed while the other is open. This is indicated by the dot-and-dash line 21 extending through the movable switch elements 15 and 18. The specific mechanism for achieving this result has not been shown, since the transfer switch unit (diagrammatically represented by the box designated 22) is known per se.

Attention is now directed to the switch assemblies diagrammatically included within the box 23. These constitute the isolating device by means of which the transfer switch unit 22 may be completely isolated from both the normal source of power, and from the load, without depriving the load of a continuing supply of power.

The switches included in the isolating device 23 include a normally closed switch in the circuit 10, consisting of at least one pair of fixed contacts 24, 25, and a complementary movable switch element 26; a similar normally closed switch in the load circuit 12, consisting of at least one pair of fixed contacts 27, 28, and a complementary movable switch element 29; and a normally open by-pass switch consisting of at least one pair of fixed contacts 30, 31, and a complementary movable switch element 32. The by-pass switch is interposed between the normal-source circuit 10 and the load circuit 12, and to achieve this purpose the fixed contacts 31 and 25 may be permanently connected as indicated at 33, and the fixed contacts 30 and 28 may be permanently connected as indicated at 34.

The isolating device 23 includes also a means for actuating the three switch assemblies in unison. This is diagrammatically represented by the dot-and-dash line 35.

In the arrangement of parts as shown in FIGURE 1, the load circuit 12 is connected to the normal source of power through the normally closed switch 27, 28, 29; the normally closed switch 13, 14, 15; and the normally closed switch 24, 25, 26. The switches of the isolating device 23 remain in the positions shown even during the normal operation of the transfer switch unit to disconnect the load from the normal source of power and connect it to the alternate source shown at 11. This transfer takes place in known fashion by an actuation of the transfer switch elements so as to open the switch 13, 14, 15 and close the switch 16, 17, 18.

Assuming, however, that the normal source of electric power is available, but access to the transfer switch unit is desired for purposes of adjustment or repair, the isolating device 23 can be operated to connect the load directly to the normal power source and to disconnect the transfer switch unit from both. This result follows when the common actuator means, indicated at 35, is caused to function to close the switch 30, 31, 32, and simultaneously open the switches 24, 25, 26 and 27, 28, 29. Subsequently, when the transfer switch unit is ready to be re-inserted into the circuit between the normal power source and the load, the parts of the isolating device are caused to resume the relative positions shown in FIGURE 1.

It is a particular feature of the invention to arrange and mount the movable switch elements of the isolating device in such a way that the switch in the normal-source circuit and the by-pass switch "overlap" whereby each opens only after the other closes. As a result, there is an unbroken continuity of power supply to the load during periods of isolation of the transfer switch unit.

The mechanical design of the isolating device 23 is best indicated in FIGURES 2, 3 and 4, which serve also to depict certain features of the invention which are not necessarily restricted to isolating devices of the kind hereinbefore referred to.

A series of spaced parallel insulating plates 40, 41, 42 and 43 are held together in any convenient manner, preferably on a supporting framework which may consist, for example, of a backing panel 44. Brackets 45 may be employed for this purpose, and rigid connecting posts 46 may be arranged at the corners of the plates. Adjacent to one end of the stack of plates is a chamber or space 47 within which control mechanism may be mounted. This space may be partly enclosed by a panel 48 spaced from and parallel to the support panel 44. Rigid connecting bars 49 will serve to hold the panel 48 in position, and a bracket 50 may be provided to lend support to the stack of plates and to the panel 48.

There is at least one pair of fixed switch contacts on each of the plates 40, 41 and 42. Where the system is a three-phase system, there are three pairs of fixed switch contacts on each plate. However, as hereinbefore mentioned, reference will be made to only one set of switch parts, to avoid duplication.

The fixed switch contacts on the plate 40 are designated 24a and 25a, since they correspond to the fixed contacts diagrammatically represented at 24 and 25 in FIGURE 1. The corresponding movable switch element is designated 26a.

Similarly, the fixed contacts on the plate 41 are shown at 30a and 31a, and the corresponding movable switch element is shown at 32a. In similar fashion the switch contacts 27a and 28a are mounted on the plate 42, and the complementary movable switch element is designated 29a.

Each of the movable switch elements has an arched central part by means of which it is moved toward and away from its set of fixed contacts. The movable switch elements are all actuated in unison by a pair of parallel reciprocable rods 51 extending through aligned openings in the plates 40—43 and connected together within the chamber 47 as indicated at 52. An actuated link 53, whose movements will presently be described in greater detail, is pivoted at 54 to the connecting piece 52. The articulation between the rods 51 and the movable switch elements includes a series of transversely-extending insulating bars rigidly secured to the rods 51 and extending beneath the arched mid-portions of the switch elements. Thus, as best indicated in FIGURE 2, a bar 55 lies beneath the switch element 26a, a similar bar 56 lies beneath the switch element 32a, and a bar 57 lies beneath the switch element 29a. Carried by each of these bars is a series of pins extending through the switch element and having an enlarged head adapted to support a spring. One of these pins is shown at 58 in FIGURE 4. It is rigidly secured to the bar 56 and has an enlarged head 59. The central part of the switch element 32a lies between the bar 56 and the head 59, and a coil spring 60 lies between the switch element and the head 59. All the movable switch elements are correspondingly mounted, and further detailed description is therefore believed to be unnecessary.

With the parts in the relationship shown in FIGURE 2, the bars 55 and 57 are free of engagement with the switch elements 26a and 29a, respectively, and the coil springs 61 and 62 are under compression, tending to hold the switch element down against the corresponding pair of fixed contacts. At the same time, the bar 56 is pressing against the under side of the switch element 32a, thereby lifting it out of contact with the fixed contacts beneath it. When the common actuator 51 is moved toward the right, the bars 55 and 57 will engage their respective movable switch elements to lift them from their respective fixed contacts; and at the same time the enlarged head 59 on the bar 56 will press the switch element 32a toward the right, i.e., down against the fixed contacts 30a and 31a.

The parts are so coordinated that the switch element 32a will always establish contact at 30a and 31a just prior to the time that the switch element 26a will sever its contact at the points 24a and 25a. Similarly, when the actuator 51 is moved toward the left, contact will always be established at 24a and 25a just prior to a separation of contact at 30a and 31a. The movable switch elements 26a and 32a may thus be said to "overlap" in their operation.

The actuating link 53 is so controlled that the actuator is always resiliently and yieldably biased into one or the other of its extreme positions. This is brought about by a toggle and spring arrangement. An actuating handle 65 is mounted on the exterior of the panel 48. It is secured to a shaft 66 suitably journaled in fixed frame parts 67 and carrying a crank disc 68 at its inner end. The end of the link 53 is pivoted to a crank pin 69. Rotation of the spindle 66 through approximately 90° or so will shift the parts between the full-line position of FIGURE 2 and the dotted position shown, thereby moving the actuator 51 from one of its extreme positions to the other. Mounted on the shaft 66 is a radial arm 70 constituting one of a pair of toggle links. At its free end, the arm 70 is pivoted (at 71) to the second of the toggle links 72. This link extends slidably through a bearing 73 mounted for pivotal movement on an axis 74. A compression spring 75 is interposed between a collar 76 on the link 72, and a corresponding collar 77 on the bearing 73. Thus, during the initial part of the rotative movement of the spindle 66, the spring 75 is compressed, and as the toggle links pass through the dead center position, the spring 75 expands and pushes the parts into the opposite setting.

It will be noted that the movable switch element 32a is arranged in an opposite direction with relation to the switch elements 26a and 29a. Where the stack of plates and switch parts is employed for other purposes, this arrangement is not necessarily followed. Moreover, it is apparent from the foregoing that any number of plates may be added to the stack, and any number of desired movable switch elements can be mounted for actuation in unison, depending upon the purposes to be accomplished in any given case.

It will also be understood that the actuating spindle 66 need not necessarily be moved by a manual knob or the like. Electrical or other means may be employed to actuate the switch elements, and under certain circumstances the actuation may be controlled from a remote point.

It will thus be noted that a relatively simple mechanical arrangement of spaced parallel insulating plates and switch contacts and elements has been provided, useful for a variety of purposes and installations, and particularly effective in controlling the operations of an isolating device for a transfer switch installation.

It will be understood that many of the details herein described may be modified by those skilled in the art without necessarily departing from the spirit and scope of the invention as expressed in the appended claims.

What is claimed is:

1. In a power plant which includes an electric circuit leading to a normal source of power, an electric circuit leading to an alternate source of power, and an electric circuit leading to a load: a transfer switch unit comprising a normally closed switch between said load circuit and said normal-source circuit, a normally open switch between said load circuit and said alternate-source circuit, and means for actuating said switches in unison so that one is always closed while the other is open; and an isolating device comprising an normally closed switch in the normal-source circuit, a normally closed switch in the load circuit, said normally closed switches being movable independently of each other, a normally open by-pass switch between said normal-source circuit and said load circuit, and means for actuating the switches of said isolating device in unison so that electrical connection between the load and the normal power source may be maintained while the transfer switch unit is isolated from both.

2. A switch installation as defined in claim 1, each switch of the isolating device comprising at least one fixed contact and a movable switch element cooperable therewith, said movable elements being coordinated so that the switch in the normal-source circuit and the by-pass switch overlap whereby each opens only after the other closes.

3. A switch installation as defined in claim 1, said isolating device comprising a stack of spaced parallel insulating plates, a pair of fixed switch contacts on each plate, a switch element movable toward and away from each pair to establish and break an electrical connection between them, said plates being provided with a set of aligned openings, and a common reciprocable actuating element extending through said openings and secured to said movable switch elements.

4. A switch installation as defined in claim 1, said isolating device comprising a stack of spaced parallel insulating plates, a pair of fixed switch contacts on each plate, a switch element movable toward and away from each pair to establish and break an electrical connection between them, said plates being provided with a set of aligned openings, and a common reciprocable actuating element extending through said openings and secured to said movable switch elements, the fixed contacts of the normally open by-pass switch facing in the opposite direction from the fixed contact pairs of the normally closed switches of the isolating device.

5. A switch installation as defined in claim 1, said isolating device comprising a stack of spaced parallel insulating plates, a pair of fixed switch contacts on each plate, a switch element movable toward and away from each pair to establish and break an electrical connection between them, said plates being provided with a set of aligned openings, a common reciprocable actuating element extending through said openings and secured to said movable switch elements, and resilient means yieldably biasing said element into each of its extreme positions.

References Cited in the file of this patent

UNITED STATES PATENTS

| 1,052,603 | McHarg | Feb. 11, 1913 |
| 2,025,653 | Dyer | Dec. 24, 1935 |
| 2,190,299 | Van Valkenburg | Feb. 3, 1940 |
| 2,514,913 | Tyrner | July 11, 1950 |
| 2,873,390 | Ubezio et al. | Feb. 10, 1959 |

OTHER REFERENCES

Standard Handbook for Electrical Engineers, 6th ed., sec. 15–83, page 1520.